United States Patent
Zabel et al.

(10) Patent No.: US 9,221,103 B2
(45) Date of Patent: Dec. 29, 2015

(54) APPARATUS FOR MACHINING THE ENDS OF PIPES

(75) Inventors: Andreas Zabel, Meerbusch (DE); Alexander Schulze, Dortmund (DE); Rainer Derix, Heinsberg (DE); Ralf Rehag, Reinstorf (DE)

(73) Assignee: SMS MEER GMBH, Moenchengladbach (DE)

( * ) Notice: Subject to any disclaimer, the term of this patent is extended or adjusted under 35 U.S.C. 154(b) by 249 days.

(21) Appl. No.: 13/995,777

(22) PCT Filed: Jan. 5, 2012

(86) PCT No.: PCT/EP2012/000031
§ 371 (c)(1),
(2), (4) Date: Aug. 19, 2013

(87) PCT Pub. No.: WO2012/100903
PCT Pub. Date: Aug. 2, 2012

(65) Prior Publication Data
US 2015/0174662 A1    Jun. 25, 2015

(30) Foreign Application Priority Data
Jan. 29, 2011  (DE) .......................... 10 2011 009 794

(51) Int. Cl.
*B23B 29/24* (2006.01)
*B23B 5/16* (2006.01)
(Continued)

(52) U.S. Cl.
CPC ... *B23B 5/16* (2013.01); *B23B 3/26* (2013.01); *B23B 29/24* (2013.01); *B23G 1/52* (2013.01); *B23B 2220/04* (2013.01); *B23B 2250/08* (2013.01); *B23B 2260/128* (2013.01); *B23B 2270/48* (2013.01); *B23G 2240/04* (2013.01); *B23G 2240/40* (2013.01); *B23G 2240/52* (2013.01)

(58) Field of Classification Search
CPC ........ B23B 29/24; B23C 1/06; Y10T 82/2529
USPC .................................... 82/113, 117, 120, 121
See application file for complete search history.

(56) References Cited

U.S. PATENT DOCUMENTS 3,645,638 A * 2/1972 Theuerkauf ................... 408/1 R
4,626,149 A * 12/1986 Holy et al. .................... 409/191

(Continued)

FOREIGN PATENT DOCUMENTS

DE       10133856 A    1/2003
JP       60-85802      5/1985
(Continued)

*Primary Examiner* — Will Fridie, Jr.
(74) *Attorney, Agent, or Firm* — Andrew Wilford

(57) ABSTRACT

The invention relates to a machine for machining the ends of pipes which, for control purposes, is assigned at least one computer unit and in the case of which the tools (13) are arranged displaceably such that they can engage radially in relation to the pipe in a tool head (11) which is driven by a motor (4) via a main spindle (10) guided through a headstock (6), the tool head rotating coaxially about the fixedly clamped pipe end, wherein the tools are arranged in tool holders in the form of slides (14A, 14B; 15A, 15B; 16A, 16B) and adjacent slides together mesh with a toothed wheel which is formed with weight compensation. According to the invention, the tool head (11) is formed with integrated advance motors (17) assigned to the slides (14A, 14B; 15A, 15B; 16A, 16B), and each slide is assigned a measuring device (24).

7 Claims, 5 Drawing Sheets

(51) Int. Cl.
  B23B 3/26 (2006.01)
  B23G 1/52 (2006.01)
  B23B 29/00 (2006.01)

(56) References Cited

U.S. PATENT DOCUMENTS

| | | | | |
|---|---|---|---|---|
| 5,662,524 | A * | 9/1997 | Esser et al. | 470/190 |
| 6,062,777 | A * | 5/2000 | Palyo et al. | 408/1 R |
| 7,241,086 | B2 * | 7/2007 | Esser | 408/152 |
| 8,746,441 | B2 * | 6/2014 | Esser | 198/776 |
| 2005/0169722 | A1 | 8/2005 | Esser | |
| 2006/0266172 | A1 | 11/2006 | Greuel et al. | |
| 2010/0058825 | A1 | 3/2010 | Marin et al. | |

FOREIGN PATENT DOCUMENTS

| | | |
|---|---|---|
| JP | 60-141403 | 7/1985 |
| JP | 7-136802 | 7/1995 |
| JP | 8-25105 | 1/1996 |
| JP | 8-206921 | 8/1996 |
| JP | 1190793 A | 3/2002 |
| JP | 1559494 A | 8/2005 |

* cited by examiner

APPARATUS FOR MACHINING THE ENDS OF PIPES

CROSS REFERENCE TO RELATED APPLICATIONS

This application is the US-national stage of PCT application PCT/EP2012/000031 filed 5 Jan. 2012 and claiming the priority of German patent application 102011009794.5 itself filed 29 Jan. 2011.

FIELD OF THE INVENTION

The invention relates to apparatus for machining pipe ends, the apparatus comprising at least one computer controller and tools movable radially of the pipe in a tool head rotatable coaxially relative to the fixedly clamped pipe end by a spindle driven by a motor and extending through a headstock, the tools being mounted in holders formed as slides, adjacent slides meshing with a respective toothed gear provided with a counterweight.

BACKGROUND OF THE INVENTION

A machine tool comprising this type of tool head for machining pipe ends, in particular, for cutting threaded connectors, has been disclosed in DE 44 38 818 [U.S. Pat. No. 5,662,524]. The pipe thread is generally produced by a single pass of the tools over the tool end, and movements of the tools are numerically controlled. The aspect that is of special significance in these machines is the actual tool head in which the tools that produce the thread or another rotary machining (surfacing as well as outer and inner chamfering) of the pipe, are positioned against the securely clamped pipe. The pipe itself is moved to a predefined position of the machine, and the tool feed is switched on as soon as the pipe end has reached its exact position.

The machining tools are movable and distributed uniformly angularly of the tool head, where, although any number of tools may be used, the most frequent approach is to provide six tools, of which three each are moved in the same direction spaced 120° apart, while the other three are moved synchronously thereto in the opposite direction spaced 120° apart. This is effected by central gears that the toothed racks of the slides supporting the tools engage. The high rotational speeds of the tool head—for example, 1000 rpm—create very high centrifugal forces on the moving masses that act against the feed forces of the tools to be precisely positioned, which feed forces must be kept as low as possible. The gears engaging the slides, which are as spur gears, thus also is function simultaneously to compensate for centrifugal forces. However, total compensation of centrifugal forces is effected only when the slides occupy their center position, i.e. an intermediate adjustment position.

DE 101 33 856 discloses an approach whereby an additional compensation device is provided in order to effect compensation whenever the slides are no longer at the same radial distance from the axis of rotation due to the radial in-feed setting such that centrifugal forces acting on them are thus no longer of the same magnitude and can no longer balance out. This device is composed of a club-shaped counterweight including gear teeth that mesh with a gear engaged with a toothed rack of a first slide. However, the countertorque can only effect a relatively small deflection with the club-shaped counterweight. Greater differential centrifugal forces on the other slide that is not engaged with the counterweight can only by balanced by a counter-torque through the first slide and the central toothed gear mounted between the two slides. An alternative provides an approach wherein the counterweight is connected to the toothed gear, or is integrated in this gear.

The current systems of the NC thread-cutting head or tool head that are based on and operate according to this prior art are based on the following functional principle.

Three mutually independent pairs of slides are embedded in one base body of the tool head.
One slide each (A slide) is fitted with a spindle and bevel pinion.
The second slide (B slide) is connected to the A slide through a toothed segment (coupling gear) and toothed racks that are mounted along the sides of the slides.
A shared crown gear meshes with the bevel pinions, which gear is a component part of the main spindle and is connected through a gear stage to a main spindle drive and a differential gear.
The motion introduced into the differential gear produces radial movement of the A slides in the tool head.
Connecting the A slide to the B slide through the central gear or coupling gear enables the centrifugal forces acting on the slides to be partially compensated.
Due to an additional compensation weight inside the coupling gear and moved by a gear assembly, this compensation is amplified further up to the point of almost total compensation of centrifugal forces.

The above-described construction of machines for machining pipe ends has inherent disadvantages in terms of precision and tolerances. This is due to the unavoidable tooth flank backlash between the coupling gear and the toothed rack that only allows a precision of at best plus/minus 0.09 mm to be achieved for the B slide—which in this example means a backlash of 0.18 mm when the slides are moved from inside to outside or visa versa. For this reason, the A slides that have a greater precision are used for cutting threads, while the B slides are used for the less demanding facing, and external and internal chamfering.

These tolerances are not adequate for producing high-specification premium couplings, which is understood to include special couplings in which conical threads, sealing seats, and abutment joint enhance the seal of the connection. This because these couplings require a precision in terms of thread diameter and sealing seat diameter that measures less than 0.01 mm, as well as a surface roughness on the sealing seat and in the abutment joint where Ra is less than or equal to 1.6 μm.

OBJECT OF THE INVENTION

The object of the invention is therefore to provide an apparatus for machining pipe ends of the above-described type that offers a significant increase in precision along with high flexibility and high processing speed so as to enable the same machine, in particular, to also produce premium or special couplings.

SUMMARY OF THE INVENTION

This object is attained according to the invention by an approach wherein the tool head is provided with integrated feed motors that are associated with the slides, and wherein a sensor is associated with each slide. The feed motors, preferably, torque motors that are mounted in the base body of the tool head, enable fast and precise compensation of shifts under load. This allows a decentralized electromechanical drive to be achieved that includes permanent monitoring of the identical positioning of all slides, and thus of all machining tools flanged onto the slides as they interact with the measurement systems. Inductive or incremental sensors/systems comprising control electronics can be linked to the control electronics, e.g. a measuring strip provided on the side of the linearly movable tool slide and including a sensing head that is mounted in the base body of the tool head can be associated with a measurement system that is installed in the control electronics.

A preferred embodiment of the invention provides an approach whereby a controlled feed motor is associated with each radial slide to effect radial tool adjustment, thereby enabling six controlled X axes to be employed for the radial positioning of the tools or slides. Aside from the fact that the entire mechanical drive train is eliminated and each of the similar slides can be positioned universally and flexibly, the electric clamping capability provides extremely high freedom from backlash, and this fulfills the requirement of being able also to produce premium or special couplings of high precision. This is furthermore achieved so as to include reverse motion along the X axis in order to generate crowned, conical, or similarly contoured sealing seats. This is because the possibility of excessively large backlash is precluded by the drive means for the slides or tools, and is essentially eliminated.

If an advantageous proposal of the invention allows the feed motors for radial adjustment to act on spindles mounted in the slides, this enables the freedom from backlash to be further enhanced due to the very short drive train acting directly on the spindles, provided in the form of roller screw drives.

It is possible optionally to have one controlled feed motor for each pair of slides for their radial tool adjustment. In contrast to the individual motors for each slide, the slide pair motors must be of larger size due to the greater required torque. It must be noted that a tool head that is provided with sensors for the slides—where the sensors can be an integral component of the slides—is well-suited to be provided as a retrofit part for existing machines for machining pipe ends, both in the first as well as the second variant configuration of the motors.

In a preferred development of the invention, the components for energy and data transmission, as well as the control and drive units, are mounted in housings that are attached rearward of the headstock, and are connected to the feed motors and the sensors of the tool head through cable guides routed through the main spindle, where in a preferred embodiment the housings for power and data transmission and for the drive and controller are mounted on the main spindle. The NC tool head, including three independent slide pairs that are embedded in its base body, is connected to the main spindle of the headstock through a mechanical interface (frustoconical seat). The drive power for the feed motors integrated in the tool head and associated controllers as well as the control-equipment-related information to the measurement system, which is required to position the slides in the tool head and also to exchange operating and status data, are transmitted through an interface between stationary and rotating parts (tubular main spindle). The non-contact transmission technologies that are preferably used for the transmission of energy and also for data (unidirectional energy transmission and bidirectional exchange of data) are especially well suited for the high rotational speeds necessitated by the large diameters (main or tubular spindle).

In order to transfer energy, an input-side rectifier and inverter is mounted as a stationary unit close to the headstock for the purpose of transmitting energy, thereby allowing the shortest possible connection to be created to the primary side of the inductive air gap transformer. Rectification and smoothing components on the secondary side can be accommodated in a housing together with the drive and controllers.

The bidirectional transmission of data is advantageously effected by capacitive coupling. The layout of the air gap capacitors on the one side and the shielding of the transformer on the other side against the intrusion of contamination thus meet the requirements specified for trouble-free operation in an industrial setting.

All of the data or signal components and power components are connected to a computer, and the control and drive units for the X axes (radial adjustment of the slides or tools) are connected through a control/drive unit to a master control/drive unit for purposes of synchronization with the main spindle and the Z axis (linear positioning of the tool slide with the headstock mounted thereon including drive motor of the mains spindle). Both controls can be linked through bus systems to effect interpolation of the axes/spindles. The master control here comprises monitoring of the X axes including displaying the operation diagrams as standard functions.

A special embodiment of the invention provides an approach wherein the base body of the tool head is provided with pockets in the spaces between the slides of each pair, in which pockets plug connectors connected to cable guides are mounted for data and power transmission. The connection between the tool head and the drive and control electronics unit mounted on the rear end of the headstock can thus be achieved through two connection points—specifically those provided at the front and rear ends of the cable guides including the cables mounted therein. This allows both the tool head to be easily removed and also enables defective components to be easily replaced. The first connection point, which is of a three-part identical design, is thus located in the pockets within the base body of the tool head. In order to disconnect the plug connections of the cable guides, only the connections in the three interior pockets have to be disconnected. The pockets are closed off by covering caps, and these then have to be removed to access the pockets. The internal holes on the floor between the pockets and the installed electrical components are designed so as to allow the cable guides including plug connectors to be passed through them. All of the energy/power or data/signal wires from the motor, sensor, and measurement systems are thus routed to the plug connectors that are mounted in the pockets within the base body of the tool head.

The second plug connections or connection points at the back end of the cable guides can be connected through pin inserts in the form of mating components to the components for energy and data transmission as well as for the control and drive units that are mounted at the back of the headstock in the stationary housings.

BRIEF DESCRIPTION OF THE DRAWING

Additional details and features of the invention are revealed in the claims and in the following description of embodiments of the invention that are depicted in the drawing. Therein:

SPECIFIC DESCRIPTION OF THE INVENTION

Figure 1:
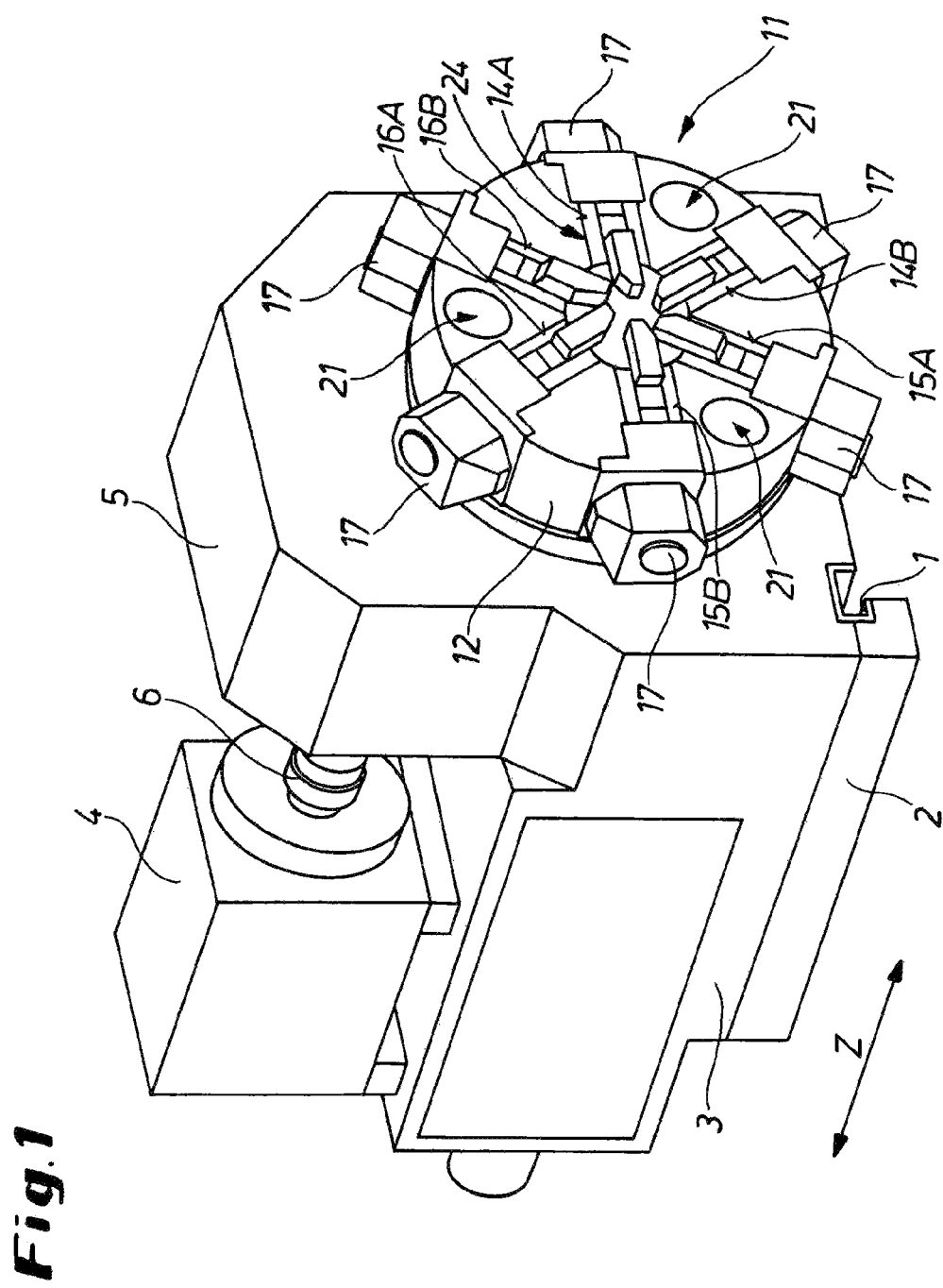
FIG. 1 is a detail providing an overall perspective view of an apparatus for machining pipe ends, its carriages or tool slides including the assemblies mounted thereon.
Figure 2:
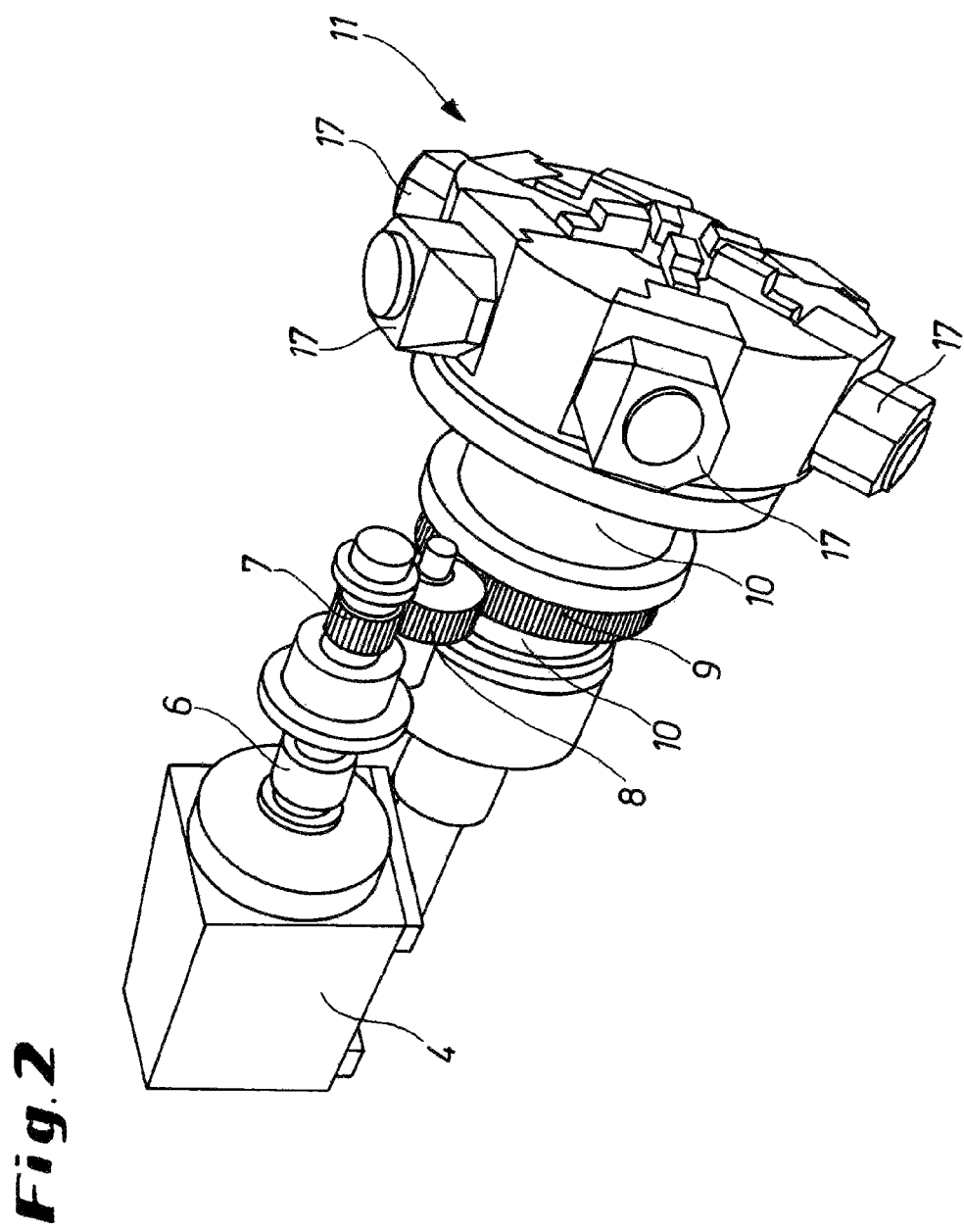
FIG. 2 is a detail of the tool slide shown in FIG. 1 providing an overall perspective view of the drive train for the tool head mounted in the main spindle.

Based on an apparatus for machining pipe ends that is sufficiently well known in terms of its fundamental constructive design, FIG. 1 shows a tool slide 2 that can be moved back and forth along slideways 1 of the machine bed longitudinally along a Z axis as indicated by the arrow. A carriage 4 and a headstock 5 are mounted on a housing 3. The motor 4 transmits torque through a drive shaft 6, a pinion 7, and an intermediate gear 8 to an outer gear ring 9 of a tubular main spindle 10 that passes through headstock 5 to rotate a tool head 11 on the front end of the headstock 5. The above-described drive train including the tool head 11 is shown in FIG. 2 without the headstock.

Figure 3:
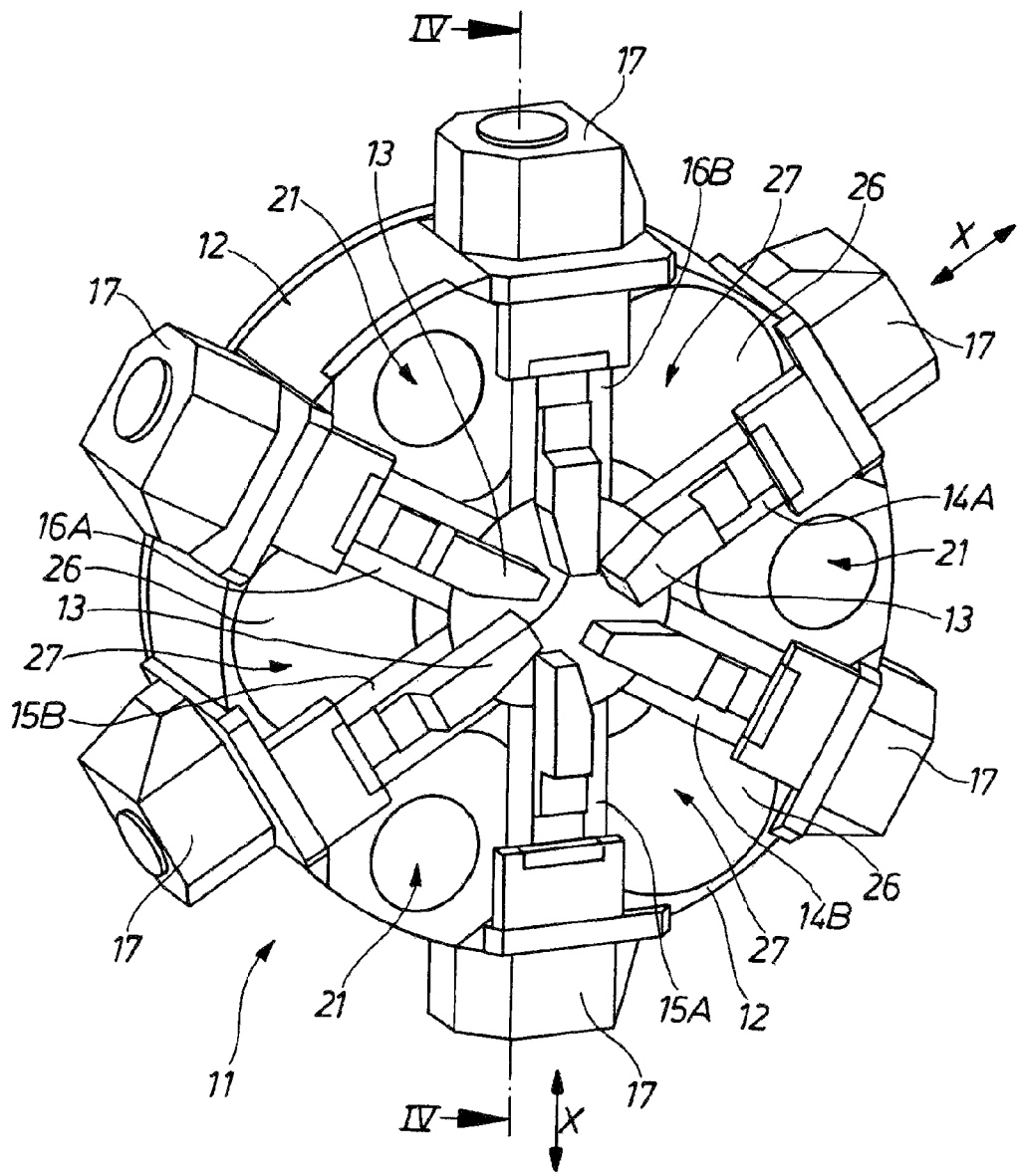
FIG. 3 is a perspective front view of the tool head of the apparatus for machining pipe ends.

The tool head 11 shown schematically in FIG. 3 has a base 12 carrying six tools 13 supported by three pairs of slides 14A-14B, 15A-15B, and 16A-16B. In order in the embodiment to radially position the slides or slide pairs, and thus the tools 13 supported thereby, a respective feed motor 17 in the form of a torque motor is provided for each slide 14A, 14B, 15A, 15B, 16A, and 16B. As an option, each pair of slides can be acted upon by one feed motor 17.

Figure 4:
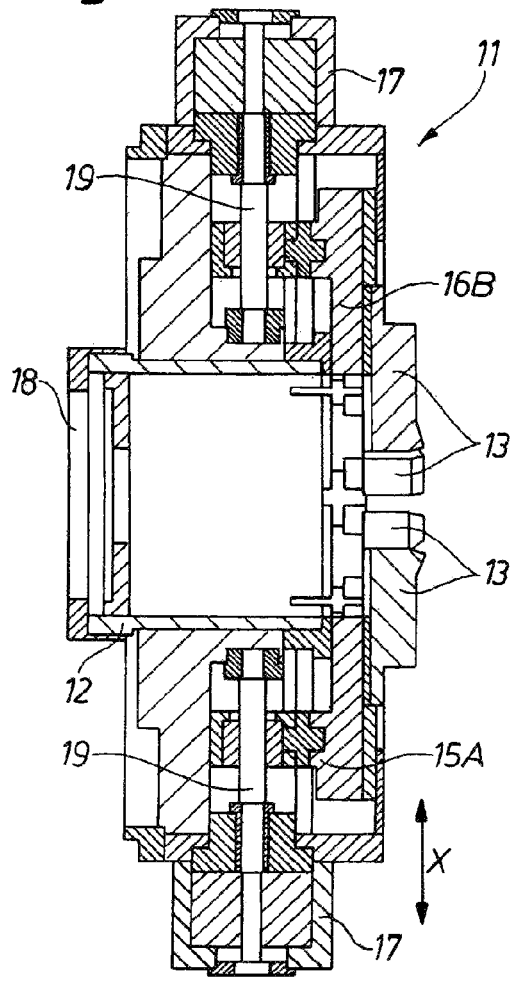
FIG. 4 depicts a longitudinal section through the tool head in FIG. 3 along line IV-IV in FIG. 3.
Figure 5:
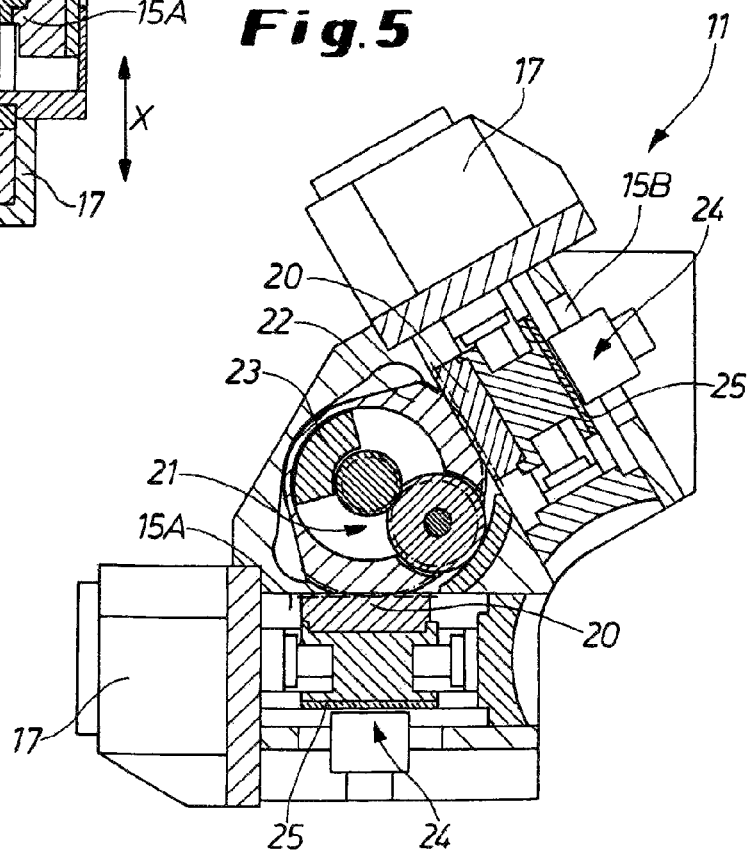
FIG. 5 is a detail from FIG. 3 providing a cross-section of a slide pair of the tool head.

The longitudinal section of FIG. 4 shows that the tool head 11 has a mechanical connection in the form of a frustoconical seat 18 for the main spindle 10 and a respective shaft 19 (roller screw drive) acted upon by each feed motor 17 to shift the slides 14A, 14B, 15A, 15B, 16A, 16B along respective X axes. As FIG. 5 shows, the one side of each slide is provided with a toothed rack 20, and the slides 14A, 14B, 15A, 15B, 16A, and 16B are interconnected through a geared connection 21 that includes a central segment gear 22 engaging adjacent toothed racks 20. The centrifugal forces created by rotation of the tool head 11 are compensated for by the coupling gear connection 21 and a counterweight 23 integrated therein.

When the apparatus for machining pipe ends is operating, the slides are permanently monitored so as to maintain the identical positioning of all slide pairs 14a, 14B, as well as 15A, 15B, and 16A, 16B, i.e. identical positioning for all A and all B slides. Each slide in the embodiment thus has a sensor 24 integrated in it, comprising a sensing head and a linear sensor 25, as indicated in FIG. 5. As an option, the slide position can be determined by a shaft encoder system on the shafts 19 of the slides.

Figure 6:
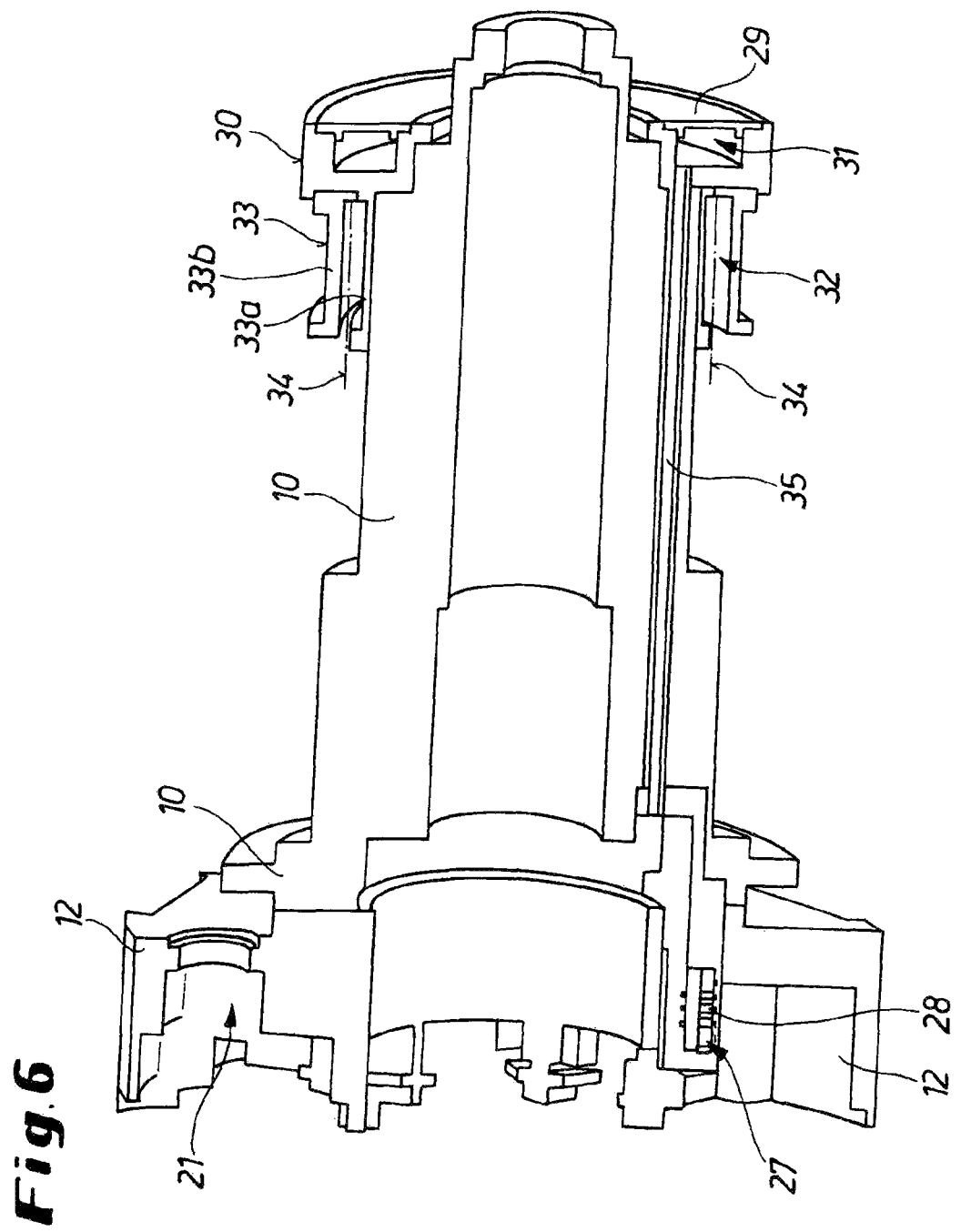
FIG. 6 is a detail showing a longitudinal section through the main spindle including the base body of the tool head mounted thereon, and housings provided at the rear or the back for data and energy transmission, and for the power electronics equipment, wherein the longitudinal section of the top half of the diagram runs in a plane that is different from the plane of the bottom half of the diagram.

The apparatus for machining pipe ends is provided with the tool head 11 that is provided in the free space or clearance between slide pairs 14A-14B, 15A-15B, and 16A-16B of its base body 12 with pockets 27 closed by covers 26 as shown in FIG. 3 and holding plug connectors 28 to which all of the energy and data wires from the motor, sensor, and measurement systems or equipment are routed (see also FIG. 6). The plug connectors 28 are assigned to the individual components (feed motor, rotor position encoder, direct measurement system).

As shown in FIG. 6, the main spindle 10 is provided with stationary and rotating components for power and signal transmission. The main spindle 10 is provided rearward of the headstock 5 (see FIG. 1), with a housing 30 closed by an outer cover 29 and holding components of the control and drive units 31 (not shown, but only indicated by an arrow) and with a two-part housing 33 holding components 32 for energy and data transmission (again indicated only by an arrow). The housing 33 is formed by an inner housing 33a rotating with the main spindle 10 and a stationary outer housing 33b, the separation between rotating and stationary parts running approximately along line 34.

A plurality of cables run through cable guides 35 in the main spindle 10 to the housings 30 and 33 of the components for the control and drive unit 31, or of the components 32 for energy and data transmission. The main spindle 10 is clearly tubular and the interior of this spindle accepts additional components and cable connections, not shown, for the transmission of power, signals, or data. The computer that controls the various drives of the apparatus for machining pipe ends, including the tool head that comprises six controlled X axes, are not shown in the figures.

The invention claimed is:

1. An apparatus for machining pipe ends of a fixedly clamped pipe, the apparatus comprising:
    at least one computer controller;
    a headstock;
    a tool head rotatable coaxially forward of the headstock relative to an end of the fixedly clamped pipe;
    a drive motor rearward of the headstock;
    a spindle driven by the drive motor, formed with a cable guide, carrying the tool head, and extending through the headstock;
    radially displaceable slides on the tool head and carrying the tools;
    respective toothed gears on the tool head meshing with adjacent slides and provided with respective counterweights;
    feed motors integrated in the tool head for the slides;
    a respective sensor on each slide;
    housings rearward of the headstock along the spindle;
    control and drive units of the controller in the housings; and
    cables between the units, the feed motors, and the sensor and extending through the cable guide.

2. The apparatus for machining pipe ends according to claim 1, wherein a respective such feed motor is provided for each slide for radial movement of the respective tool.

3. The apparatus for machining pipe ends according to claim 1, wherein a respective such feed motor is provided for each pair of slides to effect radial adjustment of the respective tools.

4. The apparatus for machining pipe ends according to claim 1, wherein torque motors are used as the feed motors.

5. The apparatus for machining pipe ends according to claim 1, wherein the feed motors act on shafts mounted in the slides.

6. The apparatus for machining pipe ends according to claim 1, wherein a base body of the tool head is provided with pockets between respective pairs of slides, the apparatus further comprising:
    plug connectors mounted in the pockets for the transmission of data and power.

7. The apparatus for machining pipe ends according to claim 1, wherein the housings are mounted on the main spindle.

* * * * *